United States Patent [19]

Rinderer

[11] Patent Number: 5,792,993
[45] Date of Patent: Aug. 11, 1998

[54] WIREWAY SEALING DEVICE

[75] Inventor: Eric R. Rinderer, Highland, Ill.

[73] Assignee: Sigma-Aldrich Company, St. Louis, Mo.

[21] Appl. No.: 835,324

[22] Filed: Apr. 7, 1997

[51] Int. Cl.[6] .................................................. H02G 3/04
[52] U.S. Cl. ............................ 174/101; 138/97; 138/92
[58] Field of Search ............................. 174/101, 68.3; 138/97–99, 92, 106; 285/419, 403, 407; 220/334

[56] References Cited

U.S. PATENT DOCUMENTS

| | | | |
|---|---|---|---|
| 758,714 | 5/1904 | Stewart | 15/50.3 |
| 1,473,290 | 11/1923 | Hammer | 220/337 |
| 1,799,876 | 4/1931 | Travis | 29/270 |
| 1,813,331 | 7/1931 | Wadsworth | 361/641 |
| 1,986,965 | 1/1935 | Frank | 174/72 C |
| 1,992,574 | 2/1935 | Jenkins | 174/72 C |
| 2,023,433 | 12/1935 | McConnell | 174/50 |
| 2,039,793 | 5/1936 | Harvey | 174/99 B |
| 2,042,778 | 6/1936 | Frank et al. | 191/23 A |
| 2,316,166 | 4/1943 | Huguelet | 285/419 |
| 2,332,017 | 10/1943 | Sedgwick | 285/334 |
| 2,353,121 | 7/1944 | Adam et al. | |
| 2,445,198 | 7/1948 | Wiesmann | 174/99 R |
| 2,714,424 | 8/1955 | Atkinson | 166/173 |
| 2,905,201 | 9/1959 | McNaughton | 285/419 |
| 2,917,083 | 12/1959 | Duvall et al. | 285/284.1 |
| 2,921,607 | 1/1960 | Caveney | 138/106 |
| 2,956,587 | 10/1960 | Fisher | 285/407 |
| 3,003,794 | 10/1961 | Burley | 285/179.1 |
| 3,003,797 | 10/1961 | Gage | 277/530 |
| 3,070,689 | 12/1962 | McIntosh | 362/362 |
| 3,243,503 | 3/1966 | Burley | 158/159 |
| 3,312,251 | 4/1967 | Marks et al. | 138/158 |
| 3,331,916 | 7/1967 | George et al. | 174/68.3 |
| 3,338,599 | 8/1967 | Hallman | 285/284.1 |
| 3,351,699 | 11/1967 | Merckle | 174/35 GC |
| 3,370,121 | 2/1968 | Merckle | 174/35 GC |
| 3,401,721 | 9/1968 | George | 138/92 |
| 3,562,402 | 2/1971 | Dwyer | 174/35 GC |
| 3,570,546 | 3/1971 | Jackson | 138/155 |
| 3,633,628 | 1/1972 | Duquette et al. | 138/116 |
| 3,636,984 | 1/1972 | Rauhauser | 138/155 |
| 3,874,550 | 4/1975 | Gordon | 220/213 |

(List continued on next page.)

FOREIGN PATENT DOCUMENTS

| | | |
|---|---|---|
| 205732 | 12/1956 | Australia . |
| 614800 | 2/1961 | Canada . |
| 657888 | 2/1963 | Canada . |
| 517209 | 1/1940 | United Kingdom . |
| 549840 | 12/1942 | United Kingdom . |
| 685964 | 1/1953 | United Kingdom . |

Primary Examiner—Kristine L. Kincaid
Assistant Examiner—Joseph Waks
Attorney, Agent, or Firm—Senniger, Powers, Leavitt & Roedel

[57] ABSTRACT

The disclosure describes a sealing device for sealing two adjacent wireway sections positioned in an end-to-end relation. Each wireway section has a lower channel portion for receiving cable and a cover movable between an open position for placing cable in the wireway section and a closed position for covering the cable. The sealing device includes a sealing plate, a seal on a lower surface of the sealing plate, and a connector for connecting the sealing plate to the lower channel portion of at least one of the two wireway sections for pivotal movement of the sealing plate between an open position in which the covers of the wireway sections can be lifted, and a closed position in which the sealing plate extends transversely across the wireway sections over the covers with the seal in engagement with the covers. The sealing device also includes a quick-operating fastening device for releasably connecting the sealing plate to the lower channel portion of at least one of the two adjacent wireway sections. The fastening device is operable when the sealing plate is in its closed position to hold the sealing plate in a sealing position in which the seal is in pressure sealing engagement with upper surfaces of the closed covers of the wireway sections to prevent entry of liquid into the wireway sections.

26 Claims, 8 Drawing Sheets

U.S. PATENT DOCUMENTS

| | | | |
|---|---|---|---|
| 4,008,937 | 2/1977 | Filippi | 439/192 |
| 4,040,449 | 8/1977 | Butler et al. | 138/92 |
| 4,077,434 | 3/1978 | Sieckert et al. | 138/92 |
| 4,349,220 | 9/1982 | Carroll et al. | 285/151.1 |
| 4,398,564 | 8/1983 | Young et al. | 138/92 |
| 4,465,330 | 8/1984 | De Cenzo | 439/92 |
| 4,891,471 | 1/1990 | Ono et al. | 174/68.3 |
| 4,924,913 | 5/1990 | Pedersen | 138/155 |
| 5,024,251 | 6/1991 | Chapman | 138/92 |
| 5,271,585 | 12/1993 | Zetena, Jr. | 248/49 |
| 5,316,243 | 5/1994 | Henneberger | 248/68.1 |
| 5,316,244 | 5/1994 | Zetena, Jr. | 248/49 |
| 5,435,606 | 7/1995 | Navazo | 285/149.1 |

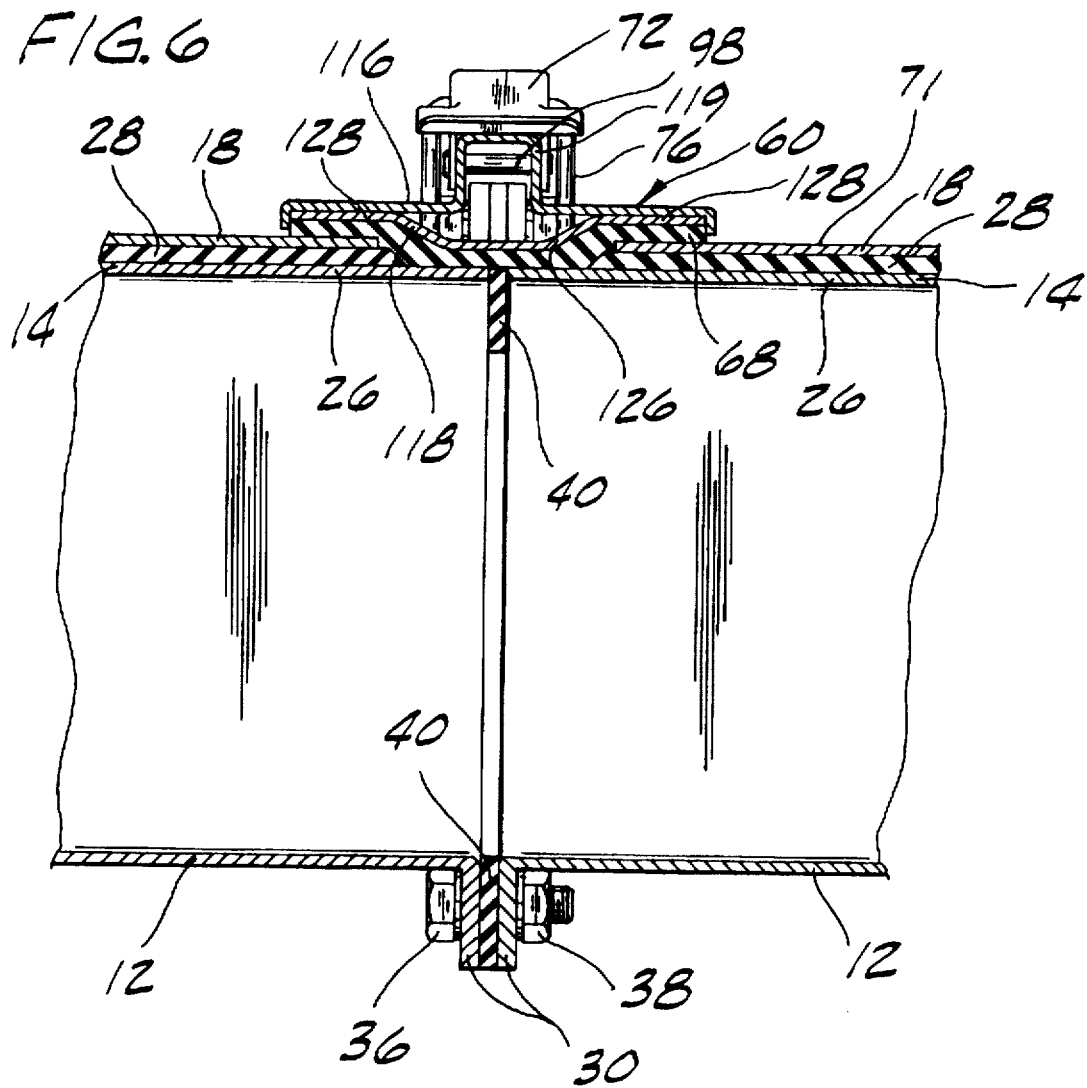

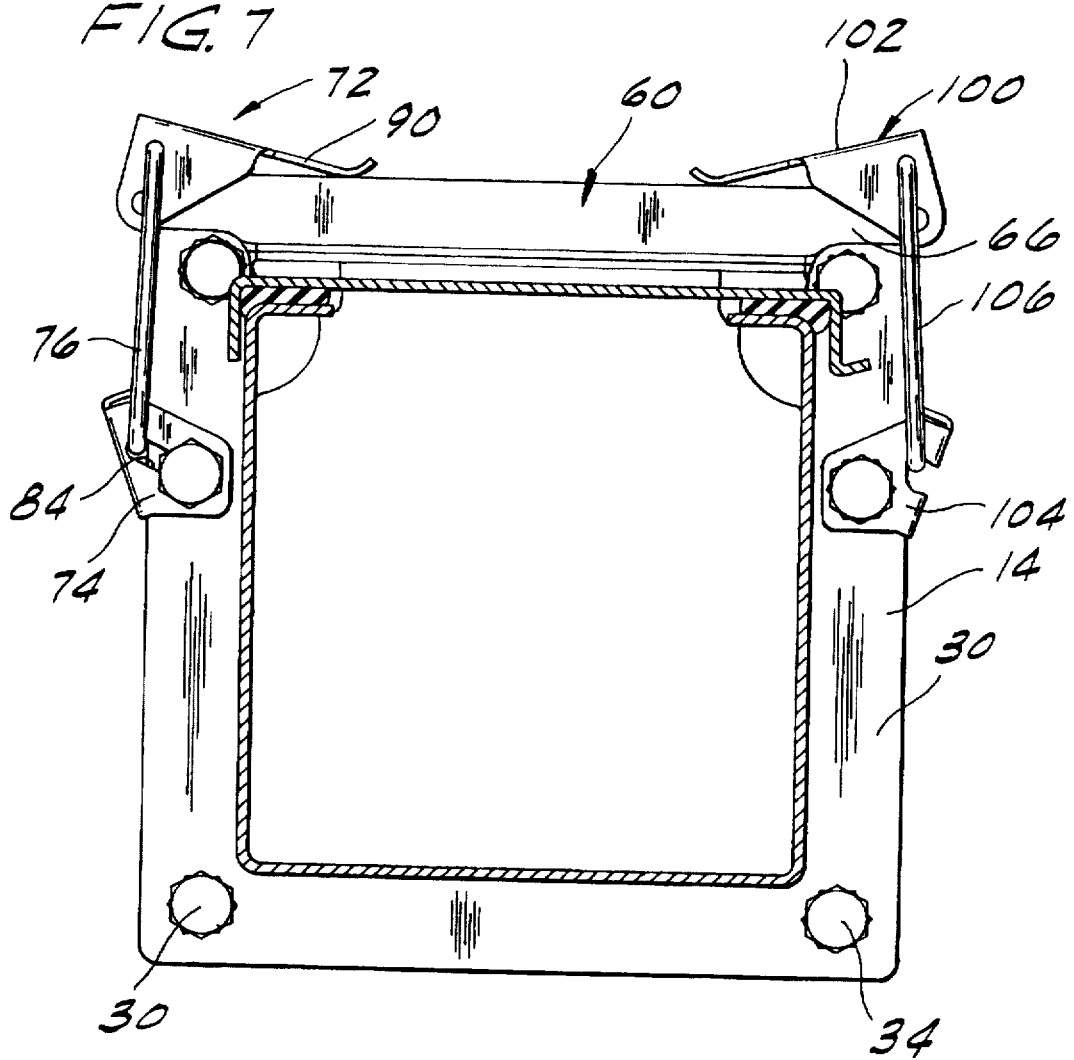
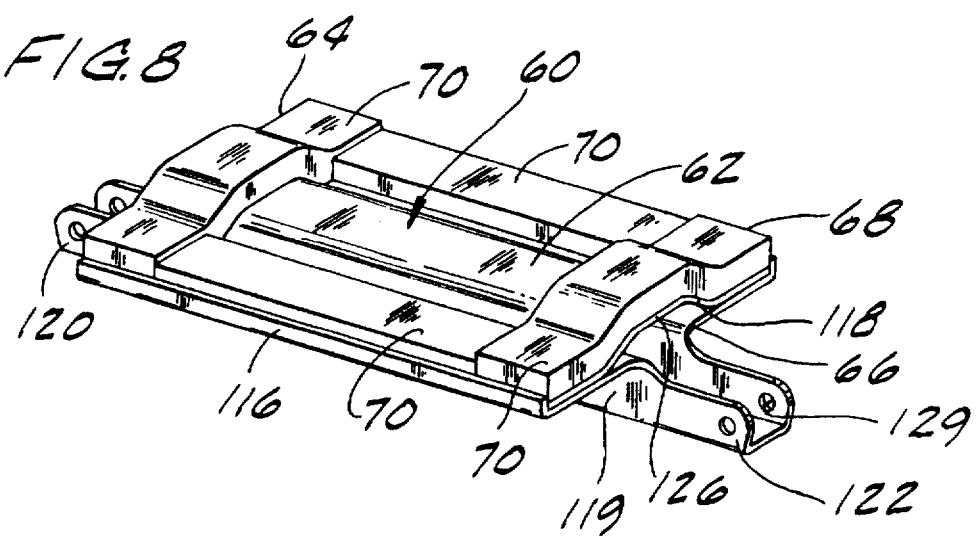

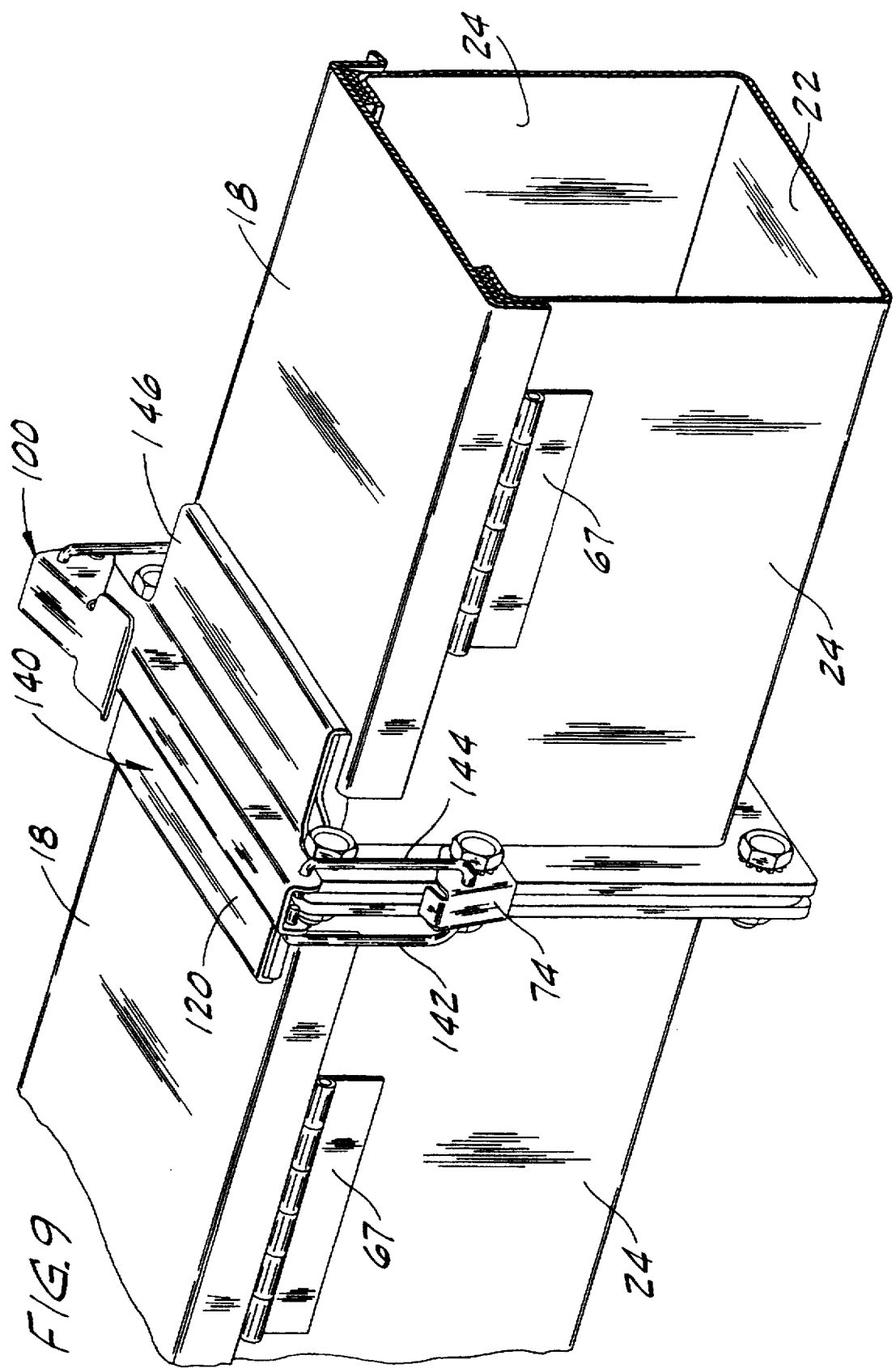

5,792,993

WIREWAY SEALING DEVICE

BACKGROUND OF THE INVENTION

This invention relates to wireway for carrying transmission cable, electrical wiring and the like (generally referred to in the trade as "cable" or "cabling"), and more specifically to a sealing plate for creating a seal at junctures of adjacent wireway sections which are connected together in end-to-end relation.

Cable is often laid in sealed wireways to prevent exposure of the cable to water and other elements. Sections of wireway are connected together to cover long stretches of corridors or other parts of buildings and to form angles for accommodating corners or other obstructions. Each wireway section typically includes a lower channel portion for receiving cable, and a cover attachable to the lower channel portion for covering the cable. The wireway sections must be connected together in a sealing relationship to prevent entry of liquid into the wireway. A sealing plate used to seal a gap between closed covers of two adjacent wireway sections must allow for quick and easy opening of the covers for access to cable located in the wireway and must not interfere with the placement or removal of cable in or from the wireway. Sealing plates which require removal of fasteners prior to opening the covers increase maintenance time and costs.

Presently available sealing plates which do not require the removal of fasteners are typically configured to be located underneath the covers and require latches along the length of the wireway to secure the covers to the lower portions of the wireway to create an adequate seal between the covers and the lower portions of the wireway. Furthermore, these sealing plates allow dirt and liquid which gather on the sealing plate to fall into the lower portion of the wireway and onto the cable when the covers are opened.

Accordingly, there is presently a need for a wireway sealing plate which allows for quick and easy opening of covers of the wireway, prevents entry of liquid and debris into the wireway upon opening the covers, and forces the covers into sealing engagement with lower channel portions of the wireway sections.

SUMMARY OF THE INVENTION

Among the several objects of this invention may be noted the provision of a wireway sealing plate which seals a gap between covers of two adjacent wireway sections to prevent liquid or other debris from entering the wireway sections; the provision of a sealing plate which allows for easy opening of the covers of the wireway sections for installment or removal of cable in or from a lower channel portion of the wireway; the provision of a sealing plate which prevents liquid or debris collected on the sealing plate from falling in the wireway when the covers are opened; the provision of a sealing plate which reduces the number of latches required along the length of the wireway section to sealingly engage the covers with the lower channel portions of the wireway sections; and the provision of a sealing plate which is economical to manufacture.

In general, a sealing device of the present invention is for sealing two adjacent wireway sections positioned in an end-to-end relation, to prevent liquid or other debris from entering the wireways. Each wireway section has a lower channel portion for receiving cable and a cover movable between an open position for placing the cable in the wireway section and a closed position for covering the cable. The sealing device comprises a sealing plate having a lower surface and first and second ends, sealing means on the lower surface of the sealing plate and a connector for connecting the first end of the sealing plate to the lower channel portion of at least one of the two adjacent wireway sections for pivotal movement of the sealing plate between an open position in which the covers of the adjacent wireway sections can be lifted to their open positions and the sealing plate does not interfere with placement or removal of cable in or from the channel portions of the wireway sections, and a closed position in which the sealing plate extends transversely across the wireway sections over the covers with the sealing means in engagement with the covers. The sealing device further comprises a quick-operating fastening device for releasably connecting the second end of the sealing plate to the lower channel portion of at least one of the two adjacent wireway sections. The fastening device is operable when the sealing plate is in its closed position to hold the sealing plate in a sealing position in which the sealing means is in pressure sealing engagement with upper surfaces of the closed covers of the two adjacent wireway sections to prevent entry of liquid into the wireway sections.

In another aspect of the invention, a wireway system comprises two wireway sections, each comprising a lower channel portion for receiving cable and a cover movable between an open position for placing cable in the wireway sections and a closed position for covering the cable, and a sealing device for sealing the two sections end-to-end. The sealing device comprises a sealing plate having a lower surface and first and second ends, sealing means on the lower surface of the sealing plate, and a connector for connecting the first end of the sealing plate to the lower channel portion of at least one of the two adjacent wireway sections for pivotal movement of the sealing plate between an open position in which the covers of the adjacent wireway sections can be lifted to their open positions and the sealing plate does not interfere with placement or removal of cable in or from the channel portions of the wireway sections, and a closed position in which the sealing plate extends transversely across the wireway sections over the covers with the sealing means in engagement with the covers. The sealing device further comprises a quick-operating fastening device for releasably connecting the second end of the sealing plate to the lower channel portion of at least one of the two adjacent wireway sections. The fastening device is operable when the sealing plate is in its closed position to hold the sealing plate in a sealing position in which the sealing means is in pressure sealing engagement with upper surfaces of the closed covers of the two adjacent wireway sections to prevent entry of liquid into the wireway sections.

Other objects and features will be in part apparent and in part pointed out hereinafter.

BRIEF DESCRIPTION OF THE DRAWINGS

FIG. 6 is cross-sectional view of the sealing device and wireway sections of FIG. 4 taken in the plane including line 6—6 of FIG. 4;

FIG. 7 is a cross-sectional view of the sealing device and wireway section of FIG. 4 taken in the plane including line 7—7 of FIG. 4;

FIG. 8 is a perspective bottom view of the sealing device of FIG. 5; and

FIG. 9 is a perspective view of a sealing device of a second embodiment connecting two wireway sections.

Corresponding reference characters indicate corresponding parts throughout the several views of the drawings.

DESCRIPTION OF PREFERRED EMBODIMENT

Figure 1:
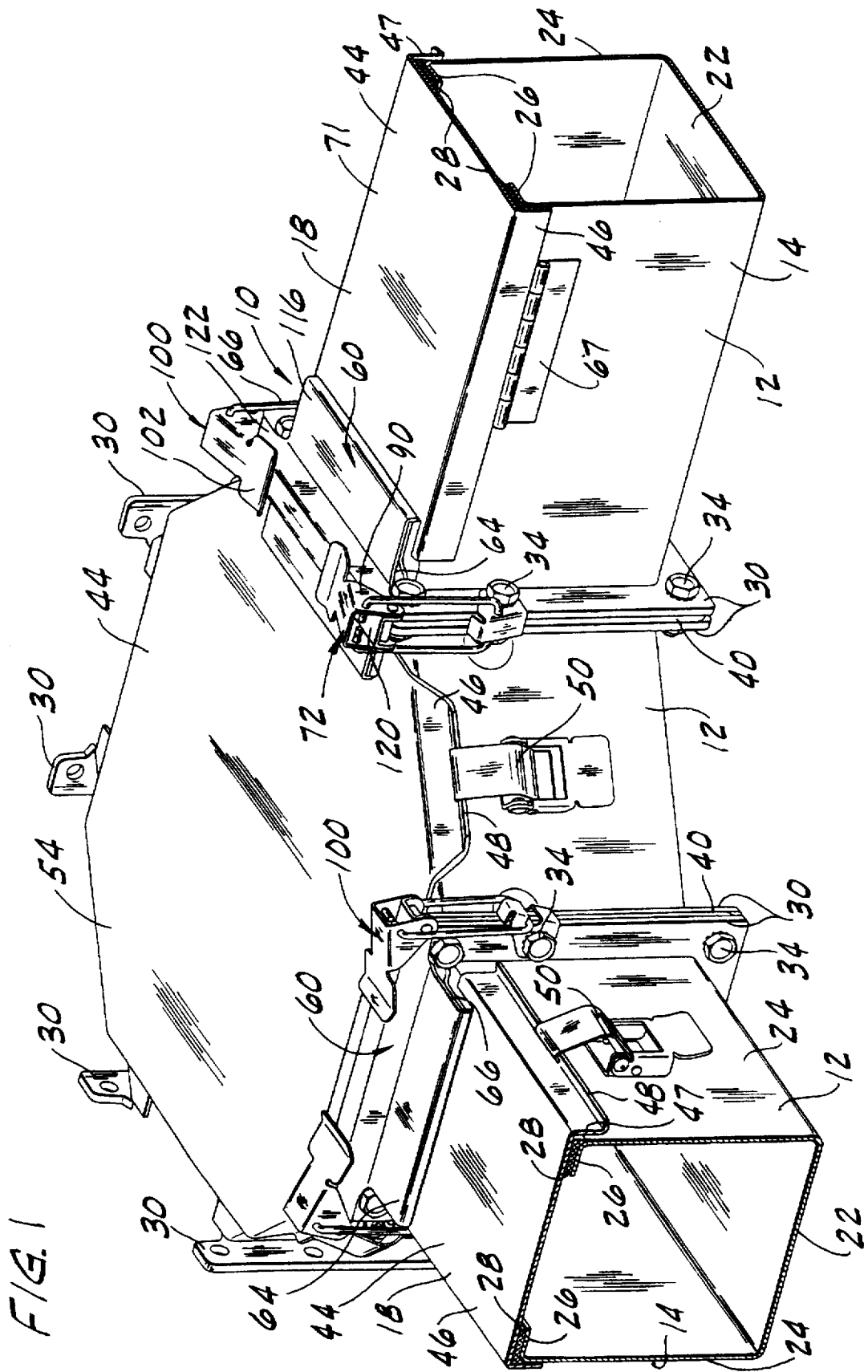
FIG. 1 is perspective view of two straight wireway sections connected to a four-way wireway section, and sealing devices of the present invention sealing the wireway sections.
Figure 2:
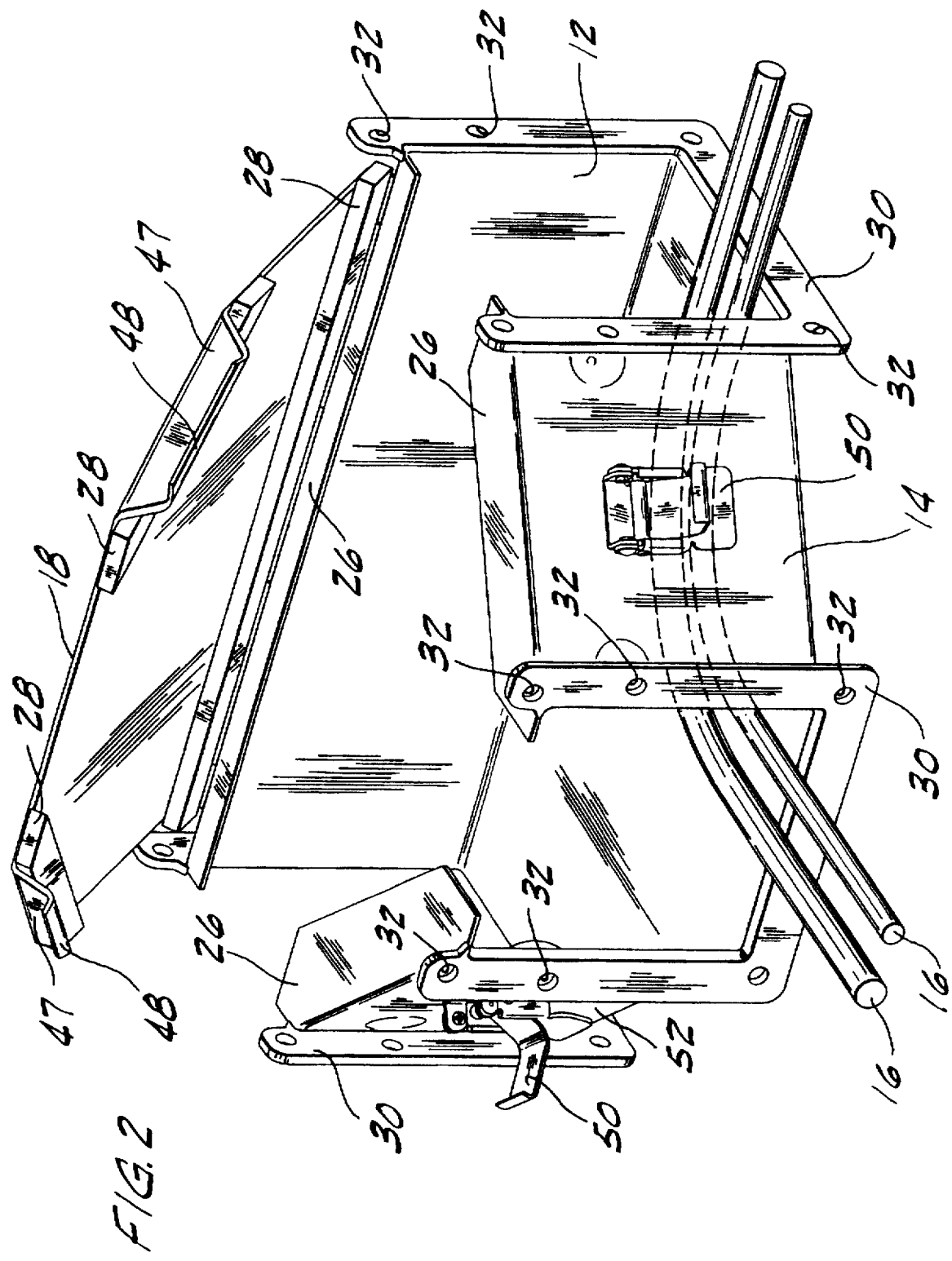
FIG. 2 is a perspective view of a three-way wireway section shown with a cover in an open position and cable located in the wireway.
Figure 3:
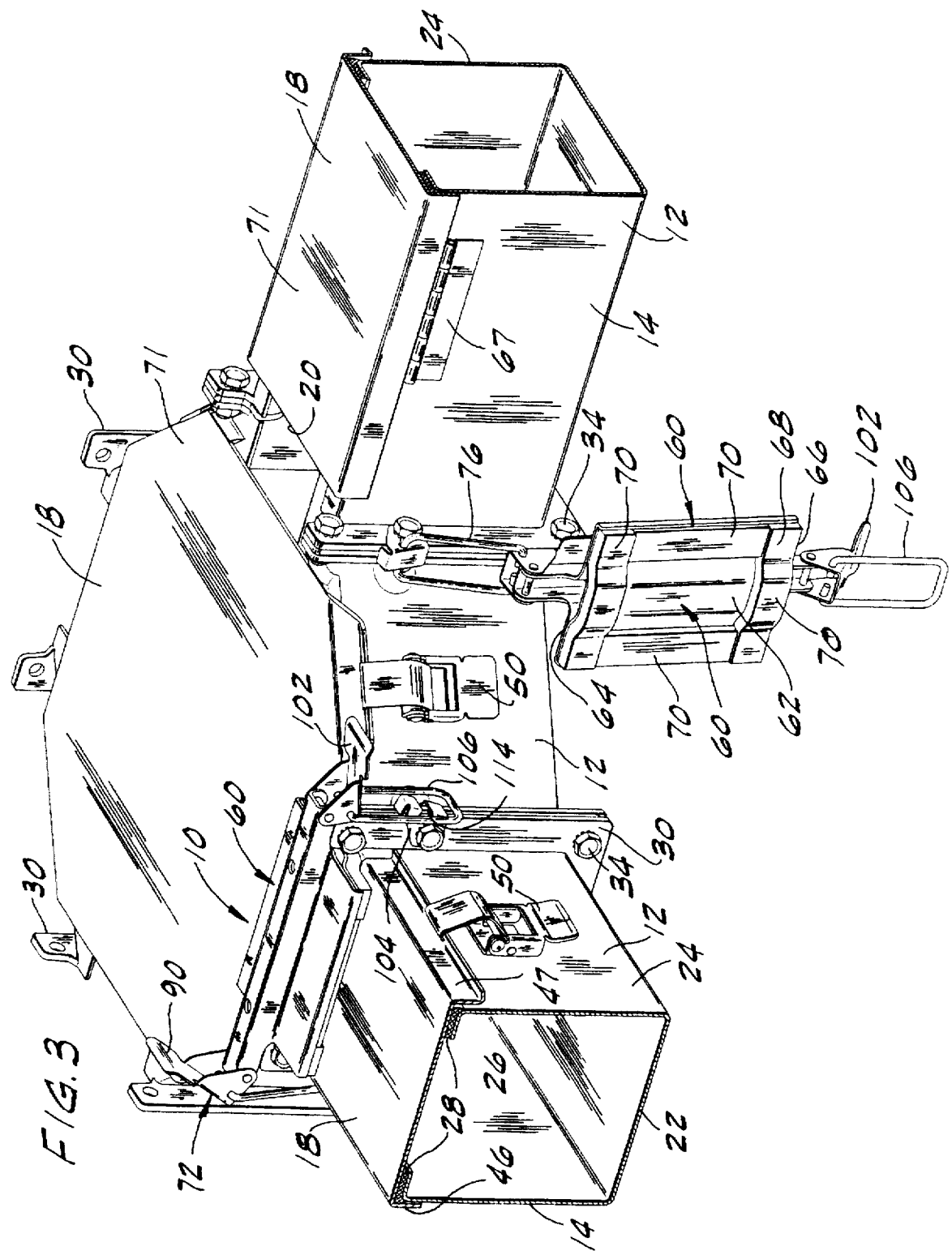
FIG. 3 is a perspective view of the wireway sections and sealing devices of FIG. 1 with fastening devices of the sealing devices in an open position and one of the sealing devices in an open position.

Referring now to the drawings, and first to FIG. 1, a sealing device of the present invention is generally indicated at 10. The sealing device 10 is used to seal two adjacent wireway sections 12 positioned in end-to-end relation, to prevent liquid or other debris from entering the wireway sections. Each wireway section 12 has a lower channel portion 14 for receiving cable 16, electrical wiring and the like (all of which can be generally referred to as "cable"), and a cover 18 movable between an open position (FIG. 2) for placing cable in the wireway section and a closed position for covering the cable (FIG. 3). A gap 20 is formed between the covers 18 of adjacent wireway sections 12 since the covers do not extend the full length of the wireway sections. The sealing device 10 is designed to cover this gap 20 and create a seal between the covers 18 and the lower channel portions 14 of adjacent wireway sections 12.

The lower channel portion 14 of the wireway section 12 is generally U-shaped as viewed in transverse cross-section, and comprises a bottom wall 22 and two side walls 24 extending up from opposite sides of the bottom wall. The upper ends of the channel portions 14 are bent to form inwardly directed flanges 26 engageable by gaskets 28 on the underside of the covers 18 for providing a seal between the covers and the lower channel portions of the wireway sections 12. An outwardly extending sealing flange 30 is provided at each end of the channel portion 14 for mating with a corresponding flange on an adjacent wireway section 12. The flanges 30 have openings 32 for receiving fasteners 34 for connecting the two wireway sections together (FIG. 2). A bolt 36 and nut 38 or any other suitable fastening device may be used (FIG. 1). A gasket 40 in the shape of the flange and having openings corresponding to the openings in the flanges is preferably placed in between mating flanges of two adjacent wireway sections 12 to provide a good sealing connection therebetween.

Figure 4:
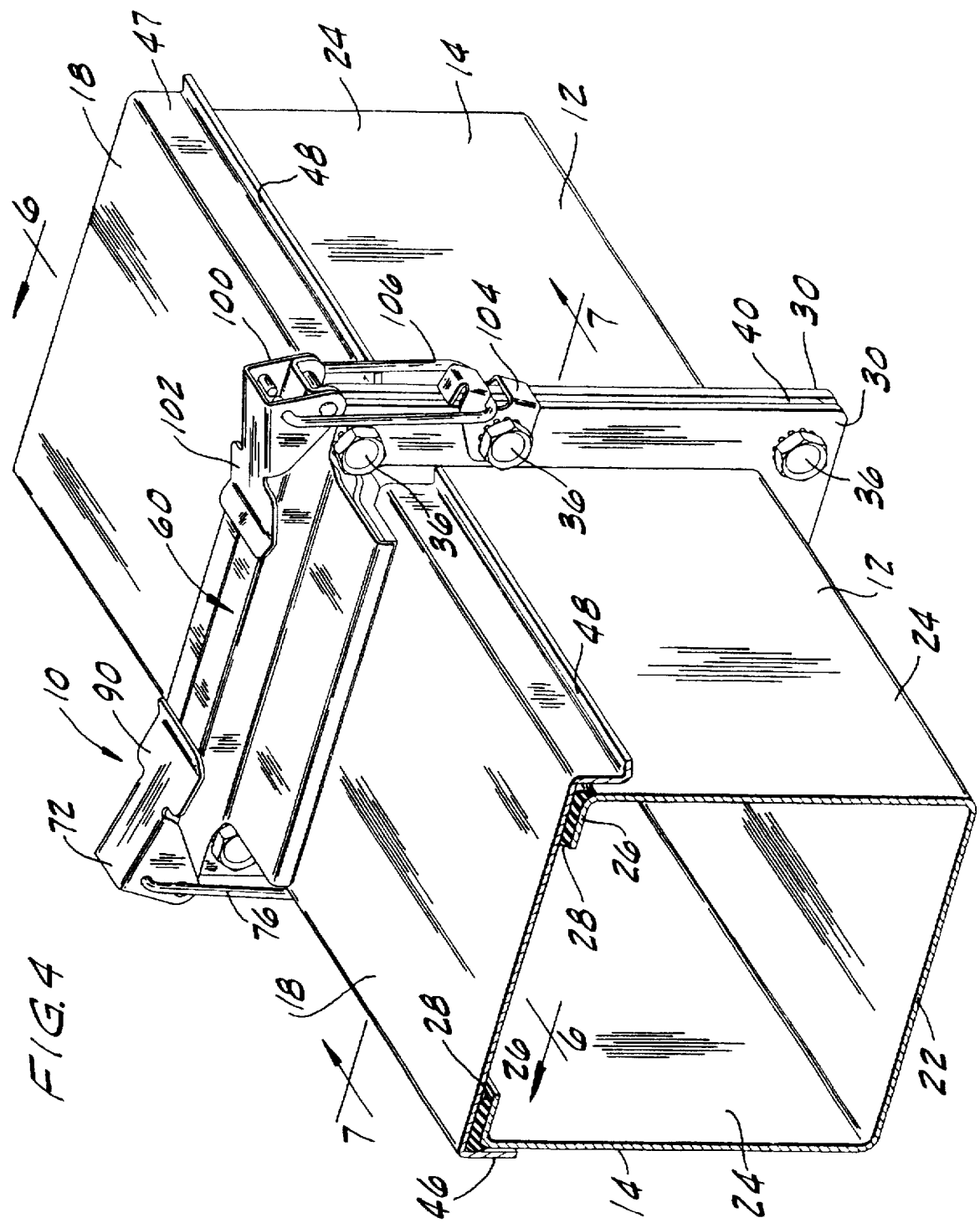
FIG. 4 is a perspective view of two straight wireway sections and a sealing device of the present invention sealing the two wireway sections.

Each cover 18 has a top wall 44 having a width slightly larger than the width of the bottom wall 22 of the channel portion 14, and two flanges 46, 47 extending down from the top wall along opposite sides of the cover. The cover 18 is connected by a hinge 67 to the lower channel portion 14 along an edge of one flange 46 of the cover. The other flange 47 of the cover 18 has an outwardly extending lip 48 for engagement by a draw-pull fastener 50 mounted on the side wall 24 of the lower channel portion 14 to hold the cover in sealing engagement with the lower portion of the wireway section. Since the sealing device 10 of the present invention forces the covers 18 into sealing engagement with the lower channel portions 14 of the wireway, as described below, the number of draw-pull fasteners 50 required along the length of a wireway section 12 is reduced and the draw-pull fasteners may even be eliminated entirely for short wireway sections. The wireway sections 12 are preferably fabricated from metal and may be formed as three-way sections 52 (FIG. 2) or four-way sections 54 (FIG. 1) for connecting three or four straight wireway sections together, respectively, or formed as a two-way corner section for connecting two straight wireway sections together, for example. Two straight elongate sections may also be connected directly together (FIG. 4). It is to be understood that the wireway and wireway sections may have configurations other than shown or described without departing from the scope of this invention.

The sealing device 10 comprises a sealing plate, generally indicated at 60, having a lower surface 62 and first and second ends 64, 66 (FIG. 3). The sealing plate 60 is adapted to be connected to the lower channel portion 14 of the wireway with the first end 64 located adjacent the side wall 24 of the wireway having the hinge 67. Sealing means, such as gaskets 68, are located on the lower surface 62 of the sealing plate 60. The gaskets 68 extend around an outer periphery of the lower surface 62 of the sealing plate 60 and may be four individual strips 70 of sealing material, or two or more individual strips of sealing material, or the gasket may be formed as a one-piece gasket.

The first end 64 of the sealing plate 60 is attached to a connector, generally indicated at 72, for connecting the sealing plate to the lower channel portion 14 of at least one of the two adjacent wireway sections 12 (FIG. 1). The connector 72 allows pivotal movement of the sealing plate 60 between an open position (FIG. 3) in which the covers 18 of the adjacent wireway sections can be lifted to their open positions and the sealing plate does not interfere with placement or removal of the cable 16 in or from the channel portions of the wireway sections, and a closed position (FIG. 1) in which the sealing plate extends transversely across the wireway sections over the covers with the gaskets 68 in engagement with the covers.

Figure 5:
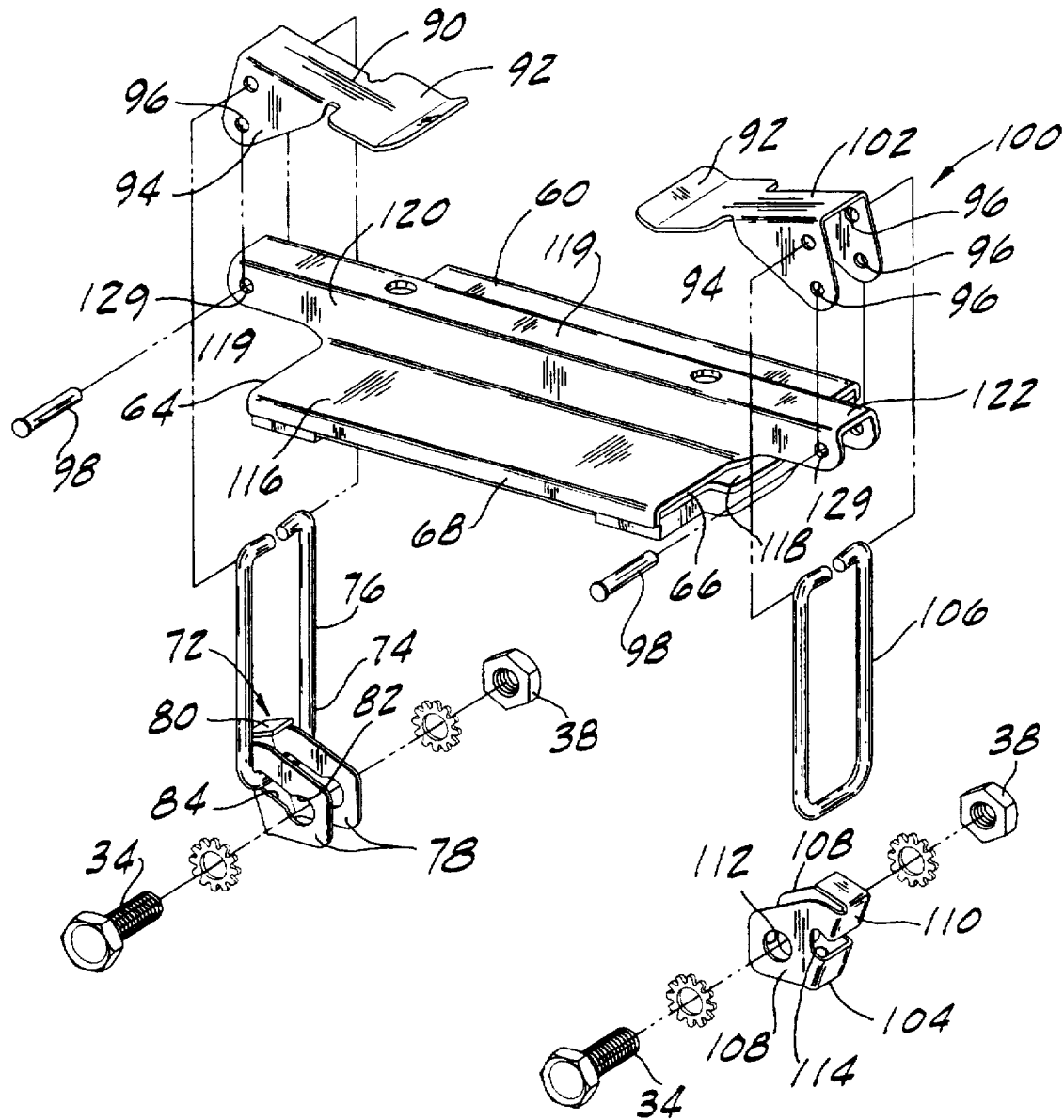
FIG. 5 is an exploded view of a sealing device of the present invention.

The connector 72 comprises a fixed hinge part 74 adapted to be immovably mounted on the lower channel portions 14 of two adjacent wireway sections 12, and a swing hinge part 76 pivotally connecting the first end 64 of the sealing plate 60 to the fixed hinge part 74. The fixed hinge part 74 has two generally parallel arms 78 extending from a central portion 80 (FIG. 5). The arms 78 are preferably spaced apart a distance sufficient to allow the fixed hinge part 74 to fit over the mating flanges 30 of adjacent wireway sections and the gasket 40 interposed between the flanges (FIG. 1). The fixed hinge part 74 may also be configured for attachment to only one of the wireway sections 12. Each arm 78 has an opening 82 for receiving the fastener 34 connecting the two wireway sections 12 and a slot 84 extending from the opening for receiving the swing hinge part 76 of the connector (FIG. 5). The swing hinge part 76 is a generally rectangular shaped wire loop having one end received in the slot 84 in the arms 78 of the fixed hinge part 74 and the other end connected to a latching lever 90 mounted on the sealing plate 60. The latching lever 90 is pivotable on the sealing plate 60 in one direction to hold the sealing plate in a sealing position, and in the opposite direction to loosen the sealing plate from its sealing position. The latching lever 90 is an over-center type lever having a tab 92 for lifting the lever and two flanges 94 extending down from the tab for engagement with the sealing plate. The latching lever 90 may be eliminated and the swing hinge part 76 connected directly to the sealing plate 60, as further described below. The latching lever 90 allows for additional adjustment of the position of the sealing plate 60 relative to the wireway to accommodate tolerance variations in the wireway and sealing device 10. Each flange includes two openings 96 for receiving the swing hinge 76 and a rivet 98 for pivotally connecting the latching lever 90 to the sealing plate 60. It is to be understood that the connector 72 may have configurations other than the one shown which allow for pivotal movement of the sealing plate 60 away from the wireway sections 12 without departing from the scope of this invention.

A quick-operating fastening device, generally indicated at 100, is provided for releasably connecting the second end 66 of the sealing plate 60 to the lower channel portion 14 of at least one of the two adjacent wireway sections 12 (FIG. 1). The fastening device 100 is operable when the sealing plate 60 is in its closed position to hold the sealing plate in a sealing position in which the gaskets 68 are in pressure sealing engagement with upper surfaces 71 of the closed covers 18 of the two adjacent wireway sections 12 to prevent entry of liquid into the wireway (FIG. 6). As best shown in FIGS. 5 and 7, the fastening device 100 comprises a latching lever 102 pivoted on the sealing plate 60 adjacent its second end 66, a keeper 104 adapted to be mounted on the lower portion 14 of the adjacent wireway sections, and a bail 106 on the latching lever engageable with the keeper (FIG. 7). The keeper 104 includes two generally parallel arms 108 extending from a central portion 110. Each arm 108 includes an opening 112 for receiving a fastener 34 connecting two adjacent wireway sections 12. The central portion 110 of the keeper 104 has a notch 114 forming a hook for receiving one end of the bail 106. The keeper 104 may also be permanently affixed to the wireway or formed as a slot in the sealing flanges 30 of the lower channel portion 14 of the wireway. The bail 106 is a generally rectangular shaped wire loop similar to the swing hinge part 76. The latching lever 102 is similar to the latching lever 90 described above for the connector 72 and is pivotable in one direction to pull the bail 106 up against the keeper 104 to hold the sealing plate 60 in its sealing position, and in the opposite direction to release the bail from the keeper. It is to be understood that the fastening device 100 may have configurations other than shown without departing from the scope of this invention.

As shown in FIGS. 6 and 8, the sealing plate 60 comprises an upper plate member 116 and a lower plate member 118. A central part 119 of the upper plate member 116 is in the shape of an inverted channel, one end of which forms a first extension 120 extending endwise from the first end 64 of the sealing plate 60 and the opposite end of which forms a second extension 122 extending endwise from the second end 66 of the sealing plate. The latching lever 90 of the connector 72 is connected to the first extension 120, and the latching lever 102 of the fastening device 100 is connected to the second extension 122 of the upper plate member 116 (FIG. 1). The flanges 94 of the latching levers 90, 102 are spaced apart to allow the extensions 120, 122 to fit between the flanges so that the openings 96 in the flanges and openings 129 in the extensions may be aligned for receiving the rivets 98 or other suitable fastening devices for connecting the latching lever to the respective extensions (FIG. 5). The lower plate member 118 has a central portion 126 extending along the plate and two side portions 128 on opposite sides of the central portion (FIG. 6). The central portion 126 projects down below the side portions 128 whereby when the sealing plate 60 is in its closed position, the side portions of the sealing plate are adapted to overlie the covers 18 of the two adjacent wireway sections 12 and the central portion is adapted to project down below the covers to a position immediately above adjacent ends of the lower channel portions 14 of the two adjacent wireway sections, the arrangement being such that the gaskets 68 of the sealing plate 60 seal not only against the upper surfaces 71 of the covers, but against the inwardly directed flanges 26 of the channel portions of the wireway. The gaskets 28 on the underside of the covers 18 preferably extend beyond the cover ends so that the gaskets 68 on the sealing plate seal against the gaskets 28 on the covers.

A second embodiment of the sealing device is shown in FIG. 9 and is generally indicated at 140. A sealing plate 146 is similar to the sealing plate 60 of the first embodiment except the connector 142 does not have a latching lever 90. The swing hinge part 144 of the connector 142 is connected directly to the first extension 120 of sealing plate 140.

To use the wireway sealing device 10, 140 of the present invention, the fixed hinge part 74 of the connector 72 is first attached to the flanges 30 of the lower channel portions 14 of adjacent wireway sections 12 by a fastener 34 connecting the wireway sections together (FIG. 3), or by other suitable means. The keeper 104 of the fastening device 100 is connected to the flanges 30 on the opposite side of the wireway section 12 adjacent to the side wall 24 having the hinge 67. The cable 16 is laid in the lower channel portions 14 of the wireway with the covers 18 and sealing plates 60, 146 in their open position. After the cable 16 is inserted into the wireway, the covers 18 and sealing plates 60, 146 are moved to their closed positions. The bail 106 of each fastening device 100 is connected to the hook 114 of its respective keeper 104, and each latching lever 102 is moved to its closed position to pull the bail up against the keeper to hold the sealing plates 60, 146 in their sealing position. The latching lever 90 of the connector 72 of the first embodiment is closed to further hold the sealing plate 60 in its sealing position. The draw-pull fasteners 50 (if any) on the side walls 24 are then closed to bring the gaskets 68 on the underside of the cover into tight sealing engagement with the flanges 26 of the lower channel portions 14 of the wireway sections 12.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A sealing device for sealing two adjacent wireway sections positioned in an end-to-end relation, to prevent liquid or other debris from entering the wireway sections, each of said wireway sections having a lower channel portion for receiving a cable and a cover movable between an open position for placing said cable in the wireway section and a closed position for covering the cable, the sealing device comprising:

a sealing plate having a lower surface and first and second ends;

sealing means on the lower surface of the sealing plate;

a connector for connecting the first end of the sealing plate to the lower channel portion of at least one of the two adjacent wireway sections for pivotal movement of the sealing plate between a sealing plate open position in which the covers of the adjacent wireway sections can be lifted to said open positions and the sealing plate does not interfere with placement or removal of the cable in or from the channel portions of the wireway sections, and a closed position in which the sealing plate extends transversely across the wireway sections over the covers with said sealing means in engagement with the covers; and quick-operating fastening device for releasably connecting the second end of the sealing plate to the lower channel portion of said at least one of the two adjacent wireway sections, said fastening device being operable when the sealing plate is in said sealing plate closed position to hold the sealing plate in a sealing position in which said sealing means is in pressure sealing engagement with upper surfaces of the covers of the two adjacent wireway sections to prevent entry of liquid into the wireway sections when said covers are in said closed position.

2. A sealing device as set forth in claim 1 wherein said sealing means is positioned on the sealing plate for sealing engagement with the covers and said lower channel portions of said two adjacent wireway sections.

3. A sealing device as set forth in claim 1 wherein said sealing plate has a central portion extending along the plate and two side portions on opposite sides of the central portion, the central portion projecting down below the side portions such that when the sealing plate is in said sealing plate closed position, the side portions of the sealing plate are adapted to overlie the covers of the two adjacent wireway sections and the central portion is adapted to project down below the covers to a position immediately above adjacent ends of the lower channel portions of the two adjacent wireway sections.

4. A sealing device as set forth in claim 3 wherein said sealing means is positioned on said side portions of the sealing plate for sealing engagement with said covers, and on said central portion for sealing engagement with said adjacent ends of the lower channel portions of the two adjacent wireway sections.

5. A sealing device as set forth in claim 3 wherein said sealing means comprises gasket means extending around an outer periphery of the lower surface of the sealing plate.

6. A sealing device as set forth in claim 5 wherein said gasket means comprises four gasket strips, each of said gasket strips extending along an edge margin of the sealing plate.

7. A sealing device as set forth in claim 1 wherein said fastening device comprises a latching lever pivoted on the sealing plate adjacent its said second end, a keeper constructed to be mounted on the lower channel portion of at least one of said two adjacent wireway sections, and a bail on the latching lever engageable with said keeper, said latching lever being pivotable in one direction to pull the bail up against the keeper to hold the sealing plate in said sealing position, and in an opposite direction to release the bail from the keeper.

8. A sealing device as set forth in claim 7 wherein said connector comprises a fixed hinge part constructed to be immovably mounted on the lower channel portion of at least one of said two adjacent wireway sections, and a swing hinge part pivotally connecting the first end of the sealing plate to the fixed hinge part.

9. A sealing device as set forth in claim 8 wherein said fixed hinge part includes a slot means in which said swing hinge part is received so that the sealing plate is free to pivot about the fixed hinge part whereby the sealing plate may be moved away from said wireway sections to allow for placement or removal of said cable in and from the lower channel portions of the wireway sections.

10. A sealing device as set forth in claim 9 wherein said latching lever of said connector is pivotable on the sealing plate in one direction to further hold the sealing plate in said sealing position, and in an opposite direction to loosen the sealing plate from said sealing position.

11. A sealing device as set forth in claim 1 wherein said sealing plate comprises an upper plate member and a lower plate member, said upper plate member having a first extension extending endwise from the first end of the sealing plate and a second extension extending endwise from the second end of the sealing plate, the connector being connected to the first extension and the fastening device being connected to the second extension of the upper plate member.

12. A wireway system comprising two adjacent wireway sections, each of said wireway sections comprising a lower channel portion for receiving a cable and a cover movable between an open position for placing said cable in the wireway sections and a closed position for covering the cable, and a sealing device for sealing the two sections end-to-end, said sealing device comprising:

a sealing plate having a lower surface and first and second ends;

sealing means on the lower surface of the sealing plate;

a connector for connecting the first end of the sealing plate to the lower channel portion of at least one of the two adjacent wireway sections for a pivotal movement of the sealing plate between a sealing plate open position in which the covers of the adjacent wireway sections can be lifted to their open positions and the sealing plate does not interfere with placement or removal of the cable in or from the channel portions of the wireway sections, and a sealing plate closed position in which the sealing plate extends transversely across the wireway sections over the covers with said sealing means in engagement with the covers; and a quick-operating fastening device for releasably connecting the second end of the sealing plate to the lower channel portion of said at least one of the two adjacent wireway sections, said fastening device being operable when the sealing plate is in said sealing plate closed position to hold the sealing plate in a sealing position in which said sealing means is in pressure sealing engagement with upper surfaces of the covers of the two adjacent wireway sections to prevent entry of liquid into the wireway sections when said covers are in said closed position.

13. A wireway system as set forth in claim 12 wherein said sealing means is positioned on the sealing plate for sealing engagement with the covers and said lower channel portions of said two adjacent wireway sections.

14. A wireway system as set forth in claim 12 wherein said sealing plate has a central portion extending along the plate and two side portions on opposite sides of the central portion, the central portion projecting down below the side portions such that when the sealing plate is in said sealing plate closed position, the side portions of the sealing plate are adapted to overlie the covers of the two adjacent wireway sections and the central portion is adapted to project down below the covers to a position immediately above adjacent ends of the lower channel portions of the two adjacent wireway sections.

15. A wireway system as set forth in claim 14 wherein said sealing means is positioned on said side portions of the sealing plate for sealing engagement with said covers and on said central portion for sealing engagement with said adjacent ends of the lower channel portions of the two adjacent wireway sections.

16. A wireway system as set forth in claim 14 wherein said sealing means comprises gasket means extending around an outer periphery of the lower surface of the sealing plate.

17. A wireway system as set forth in claim 14 wherein said gasket means comprises four gasket strips, each of said gasket strips extending along an edge margin of the sealing plate.

18. A wireway system as set forth in claim 12 wherein said fastening device comprises a latching lever pivoted on the sealing plate adjacent to said second end, a keeper constructed to be mounted on the lower portion of at least one of said two adjacent wireway sections, and a bail on the latching lever engageable with said keeper, said latching lever being pivotable in one direction to pull the bail up against the keeper to hold the sealing plate in said sealing position, and in an opposite direction to release the bail from the keeper.

19. A wireway system as set forth in claim 18 wherein said connector comprises a fixed hinge part constructed to be immovably mounted on the lower channel portion of said at least one of said two adjacent wireway sections, and a swing hinge part pivotally connecting the first end of the sealing plate to the fixed hinge part.

20. A wireway system as set forth in claim 19 wherein said fixed hinge part includes slot means in which said swing hinge part is received so that the sealing plate is free to pivot about the fixed hinge part whereby the sealing plate may be moved away from said wireway sections to allow for placement or removal of said cable in and from the lower channel portions of the wireway sections.

21. A wireway system as set forth in claim 20 wherein said is latching lever of said connector pivotable on the sealing plate in one direction to further hold the sealing plate in its said sealing position, and in an opposite direction to loosen the sealing plate from said sealing position.

22. A wireway system as set forth in claim 12 wherein said sealing plate comprises an upper plate member and a lower plate member, said upper plate member having a first extension extending endwise from the first end of the sealing plate and a second extension extending endwise from the second end of the sealing plate, the connector being connected to the first extension and the fastening device being connected to the second extension of the upper plate member.

23. A wireway system as set forth in claim 12 wherein said cover of said adjacent wireway section is held in a sealing position against the lower channel portions only by the sealing plates located at respective end of the wireway sections.

24. A wireway system as set forth in claim 12 wherein each lower channel portion comprises a bottom wall, side walls extending upwardly from opposite sides of the bottom wall, and flanges extending inwardly from upper ends of the sides walls, the sealing means being positioned on the sealing plate for sealing engagement with the covers and the flanges of said two adjacent wireway sections.

25. A sealing device as set forth in claim 1 wherein said fastening device comprises a lever assembly mounted on the sealing plate, said lever assembly being releasably engageable with a keeper on the lower portion of said at least one of said adjacent wireway sections for holding the sealing plate in its said sealing position.

26. A wireway system as set forth in claim 12 wherein said fastening device comprises a lever assembly mounted on the sealing plate, said lever assembly being releasably engageable with a keeper on the lower portion of at least one of said adjacent wireway sections for holding the sealing plate in said sealing position.

* * * * *